March 6, 1945.  K. W. COUSE  2,370,718
LATHE FITTINGS FOR MACHINING PIPE AND THE LIKE
Filed Nov. 24, 1943  3 Sheets-Sheet 2

INVENTOR
Kibbey W. Couse
BY
A. D. T. Libby
ATTORNEY

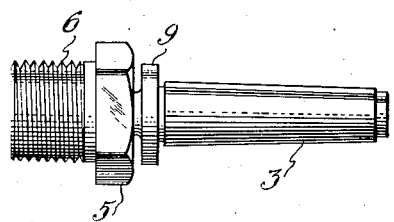
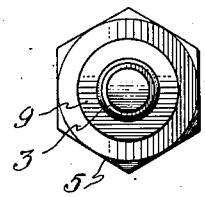
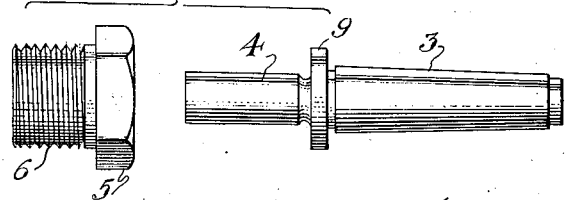
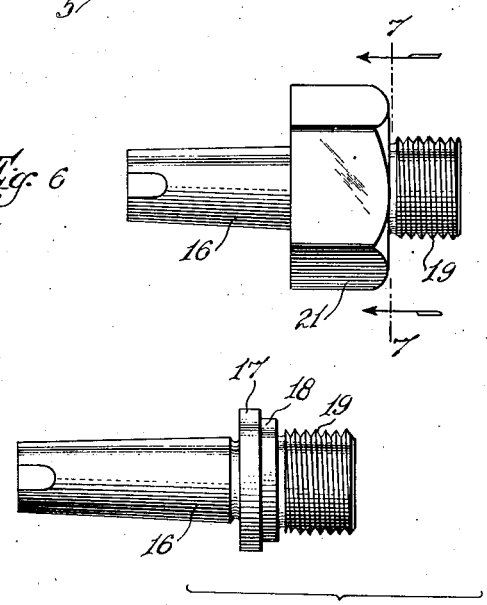
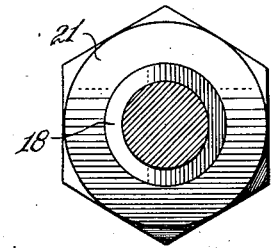
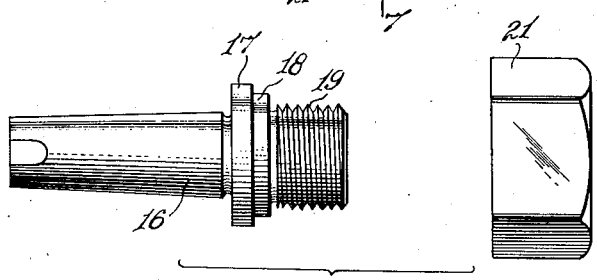

Patented Mar. 6, 1945

2,370,718

UNITED STATES PATENT OFFICE 2,370,718

LATHE FITTINGS FOR MACHINING PIPE AND THE LIKE

Kibbey W. Couse, Newark, N. J.

Application November 24, 1943, Serial No. 511,547

4 Claims. (Cl. 82—44)

This invention relates to apparatus for turning or machining hollow articles such as pipes. Since a pipe is hollow, there is no good way of mounting it in a lathe for the turning operation, as there is nothing for the pointed tail stock to engage the end of the pipe and hence no support for this outer end of the pipe.

Therefore the principal object of my invention is the association of machine tools and parts which will enable pipes and the like to be readily mounted in a lathe in such a manner that both ends of the pipe may be securely and accurately supported between the head and tail stocks of a lathe, whereby the pipe may be machined to a true cylindrical surface.

My invention will be readily understood by reference to the annexed drawings wherein:

Figure 3 is an assembled view of the new parts required at the tail stock end of the lathe.

Figure 4 is a view of Figure 3 looking from right to left.

Figure 5 is a view of the parts shown in Figure 3, but in disassembled relationship.

Figure 6 is an assembled view of the new parts required at the head stock end of the lathe.

Figure 7 is a view on the line 7—7 of Figure 6.

Figure 8 is a view of Figure 6 shown in disassembled relation.

Figure 1:
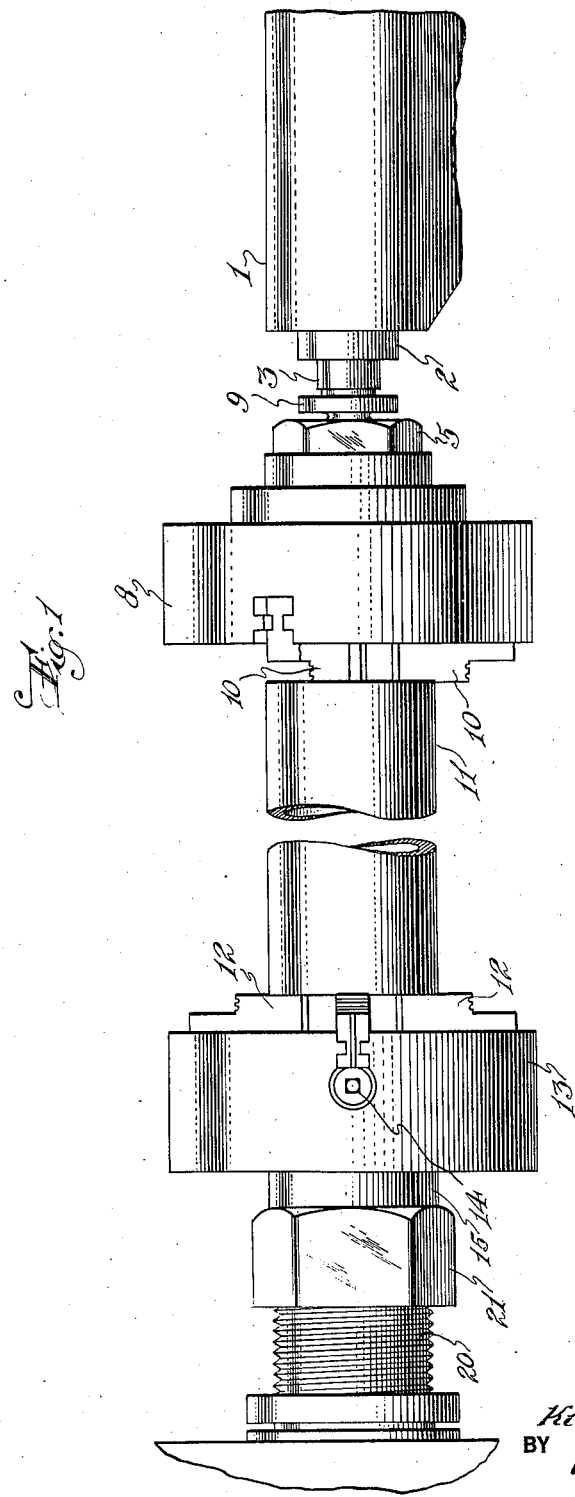
Figure 1 is a completely assembled plan view of the parts required to accomplish the principal object above set forth.

In the drawings, wherein like numbers refer to corresponding parts, 1 is a fragmentary portion of a part of the lathe tail stock having a bushing 2 within which is non-rotatably fitted a member 3 having a tapered fit within the bushing 2. The member 3 has a cylindrical end 4 which serves as a bearing for a rotatable threaded bushing 5 that has threads 6 for screwing into a member 7 forming a part of the chuck 8. Between the bearing end 4 and the tapered portion of the member 3, is located a collar 9 which acts to position the chuck 8 and threaded bushing 5 on the bearing 4. The chuck jaws 10 are adapted to grip the inner wall of the pipe 11 to support this end of the pipe in a secure manner.

The opposite end of the pipe 11 is engaged by the chuck jaws 12 of the chuck 13, one of the clamping screws 14 being illustrated. The chuck 13 has a threaded member 15 into which is screwed an elongated rigid guide bushing 16. The guide bushing 16 has a pair of collars 17 and 18, both adjacent one to the other and to the threaded portion 19 of the member 16. The guide bushing 16 has a long tapered end fitting within the exteriorly threaded member 20 which is the lathe head stock spindle.

Figure 2:
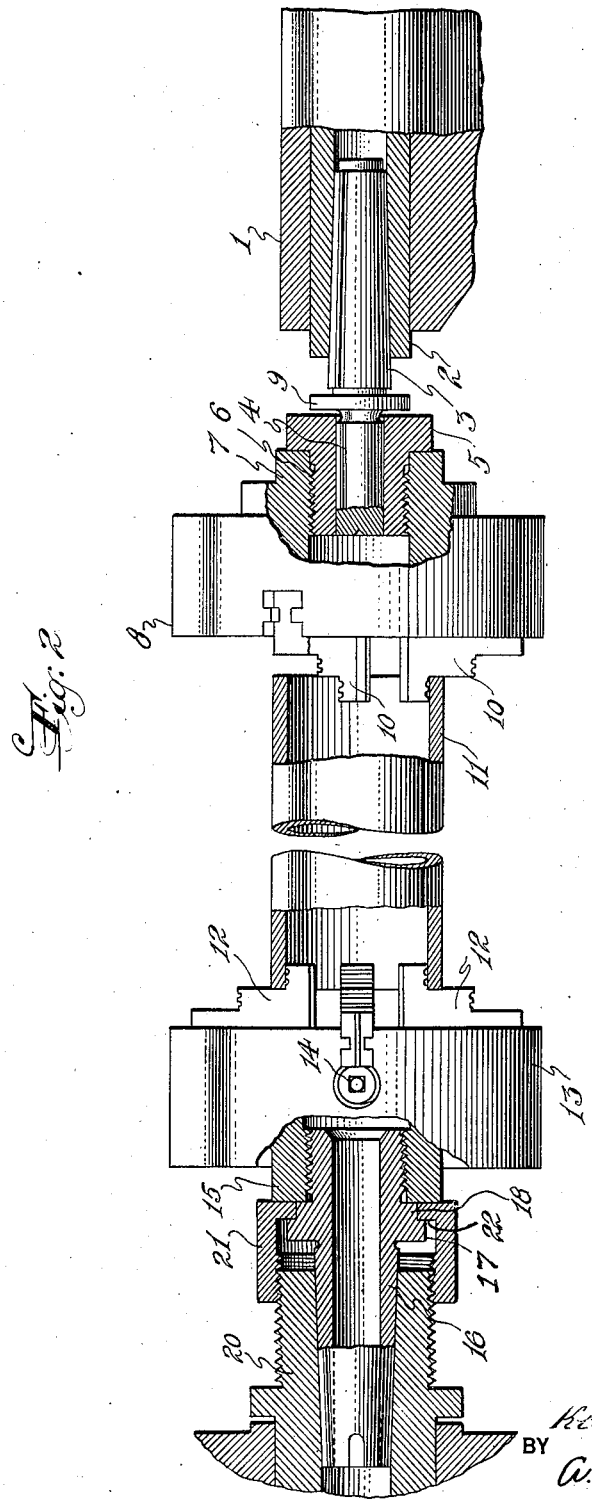
Figure 2 is a view similar to Figure 1, but showing, partly in section and partly in elevation, the parts required to accomplish the object of the invention.

A draw-in nut 21 has a flange 22 seated on the collar 18 and engaging the collar 17, as shown in Figure 2, so that when the nut 21 is drawn up onto the threaded member 20, it forces the elongated tapered bushing 16 into firm engagement with the member 20.

It may be noted that the chucks 8 and 13 are standard parts and may be of the independent type, wherein each chuck jaw is operated by its clamping screw 14; or they may be of the universal type wherein all of the chuck jaws are simultaneously operated by one set screw. In either case, the chuck jaws provide means for gripping the pipe on its interior wall, whereby the machining may be performed on the outer surface of the pipe. As the pipe is turned from the head stock end of the lathe through the parts just described, it will be noted that the threaded bushing 5 turns with the chuck on the bearing portion 4 of the member 3 as heretofore described. If desired, the bearing portion 4 may be provided with oil grooves and means for passing oil thereto for oiling the bearing.

From what has been said, it will be seen that the new parts that I have provided for cooperation with standard chucks and lathe portions, are those parts shown in Figures 3 to 8 inclusive, thereby providing simple, cheap and quickly adaptable means for machining pipes or the like.

While I have shown the chuck jaws as engaging the inside of the pipe, the jaws may engage the outside of the pipe when circumstances warrant.

What I claim is:

1. Fittings for use with a lathe and standard chucks for machining pipe and the like including tail and head stock ensembles; the tail stock ensemble comprising a member non-rotatably carried at one end by a bushing in the lathe tail stock, the opposite end of said member terminating in a bearing, a bushing having a threaded exterior extension for engaging a threaded chuck member, while its interior surface is cylindrical to fit over and turn on said bearing; the head stock ensemble comprising an elongated rigid guide bushing having a pair of collars intermediate its length, one end of the guide bushing being threaded to engage a threaded member on another chuck, the other end of the guide bushing having a tapered end to fit a cooperative surface within an exteriorly threaded member of the lathe stock spindle, and a nut engaging said exteriorly threaded member and having a flange seated on one of said collars and engaging the other collar, whereby when said nut is drawn up the tapered end of said guide bushing is forced into firm engagement with said head stock spindle member, the pipe to be machined being carried between said two chucks having jaws to engage the interior of the pipe ends.

2. Fittings for use with a lathe and standard chucks for machining pipe and the like including tail and head stock ensembles; the tail stock ensemble comprising a member having one end tapered and non-rotatably fitting in a bushing carried by the lathe tail stock, a positioning collar on said member adjacent said tapered end, the end of said member, on the opposite side of said collar from the tapered end, being cylindrical to form a bearing, an extended bushing having a smooth interior surface to fit said bearing end and a threaded exterior for engaging a threaded chuck member; the head stock ensemble comprising an elongated rigid guide bushing having one end threaded to engage a threaded member of another chuck, while its opposite end is formed to non rotatably fit the interior of a member of the lathe head stock spindle, this last-mentioned member being exteriorly threaded to receive a nut, said nut having a flange to cooperate with a pair of collars on said guide bushing whereby when said nut is drawn up a secure union is obtained between the guide bushing and the lathe head stock spindle member, the pipe to be machined being carried between said two chucks having jaws engaging the interior of the pipe ends.

3. Fittings for use with a lathe and standard chucks having jaws to grip the interior of the pipe ends including tail and head stock ensembles; the tail stock ensemble comprising a member having a bearing surface at one end while its opposite end is adapted to be non rotatably carried by a tail stock bushing with a chuck-locating collar positioned between said two ends, a threaded bushing having an exterior portion securely engaged by a chuck member and an interior surface to coact with said member bearing surface; the head stock ensemble comprising an elongated rigid guide bushing having one end formed to non-rotatably fit the interior surface of a lathe head stock spindle member having an exterior threaded surface, the opposite end of said guide bushing being securely engaged by a member of another chuck, said bushing carrying a nut engaging the threads on said head stock spindle member, the nut and guide bushing having cooperative formations by which when the nut is drawn up a firm union is made between said guide bushing and the head stock spindle member.

4. Fittings for use with a lathe and standard chucks having jaws to grip the pipe ends including tail and head stock ensembles; the tail stock ensemble consisting of two pieces; namely, a member adapted to be fastened to the tail stock and having a bearing surface at one end with an integral annular collar adjacent said bearing surface, and a bushing rotatably carried on said bearing surface adjacent said collar, the bushing being threaded to engage a threaded chuck part independent of the chuck jaws that grip the pipe; the head stock ensemble consisting of an elongated bushing having one end threaded to engage a threaded part of another chuck independent of the chuck jaws that grip the pipe, while its opposite end has a long taper to fit into a head stock part, the bushing having an enlargement between the threaded part and the tapered part, and a take-up device engaging said enlargement and overlapping the same and adjustably engaging said head stock part so as to force said bushing and part into secure operative engagement.

KIBBEY W. COUSE.